United States Patent [19]

Dehne

[11] 3,777,879
[45] Dec. 11, 1973

[54] CONTROL FOR A CONVEYOR TAKE-UP
[75] Inventor: Clarence A. Dehne, Farmington Township, Mich.
[73] Assignee: Jervis B. Webb Company, Detroit, Mich.
[22] Filed: Nov. 30, 1971
[21] Appl. No.: 203,210

[52] U.S. Cl. .................................. 198/208, 91/437
[51] Int. Cl. ............................................ B65g 15/30
[58] Field of Search .................. 91/411 A, 436, 437; 198/208, 139

[56] References Cited
UNITED STATES PATENTS

| 2,713,935 | 7/1955  | Bishop ........................ 198/208 |
| 2,460,196 | 1/1949  | Simpson ..................... 91/411 A |
| 2,532,663 | 12/1950 | Ellis .............................. 91/436 |
| 3,452,645 | 8/1969  | Barltrop ...................... 91/437 |
| 2,438,068 | 3/1948  | Mercier ...................... 198/208 |
| 2,794,538 | 6/1957  | Schenk ....................... 198/208 |

Primary Examiner—Richard E. Aegerter
Assistant Examiner—Joseph E. Valenza
Attorney—Farley et al.

[57] ABSTRACT

Relative movement between the fixed and movable frames of a conveyor take-up is controlled by a hydraulic cylinder and piston unit, the cylinder of which is connected to one of the frames and the piston to the other, the movable take-up frame being normally urged in an extending direction to apply tension to the conveyor chain. The hydraulic cylinder is connected to a fluid passage containing an orifice which permits fluid flow at a controlled rate in response to extending movement of the take-up, and containing a check valve which obstructs fluid flow in the opposite direction and prevents collapsing movement of the take-up. A normally open solenoid valve in this passage is operable to obstruct flow in both directions in the event the conveyor drive shuts down. A pressure relief valve mounted in an alternate passage permits collapsing take-up movement in the event of abnormal tension in the conveyor chain. In one embodiment, the hydraulic cylinder is combined with an air cylinder, and the pistons of both cylinders are mounted on a common rod, the air cylinder being supplied with regulated air pressure to apply a normal extending force to the movable take-up frame.

6 Claims, 4 Drawing Figures

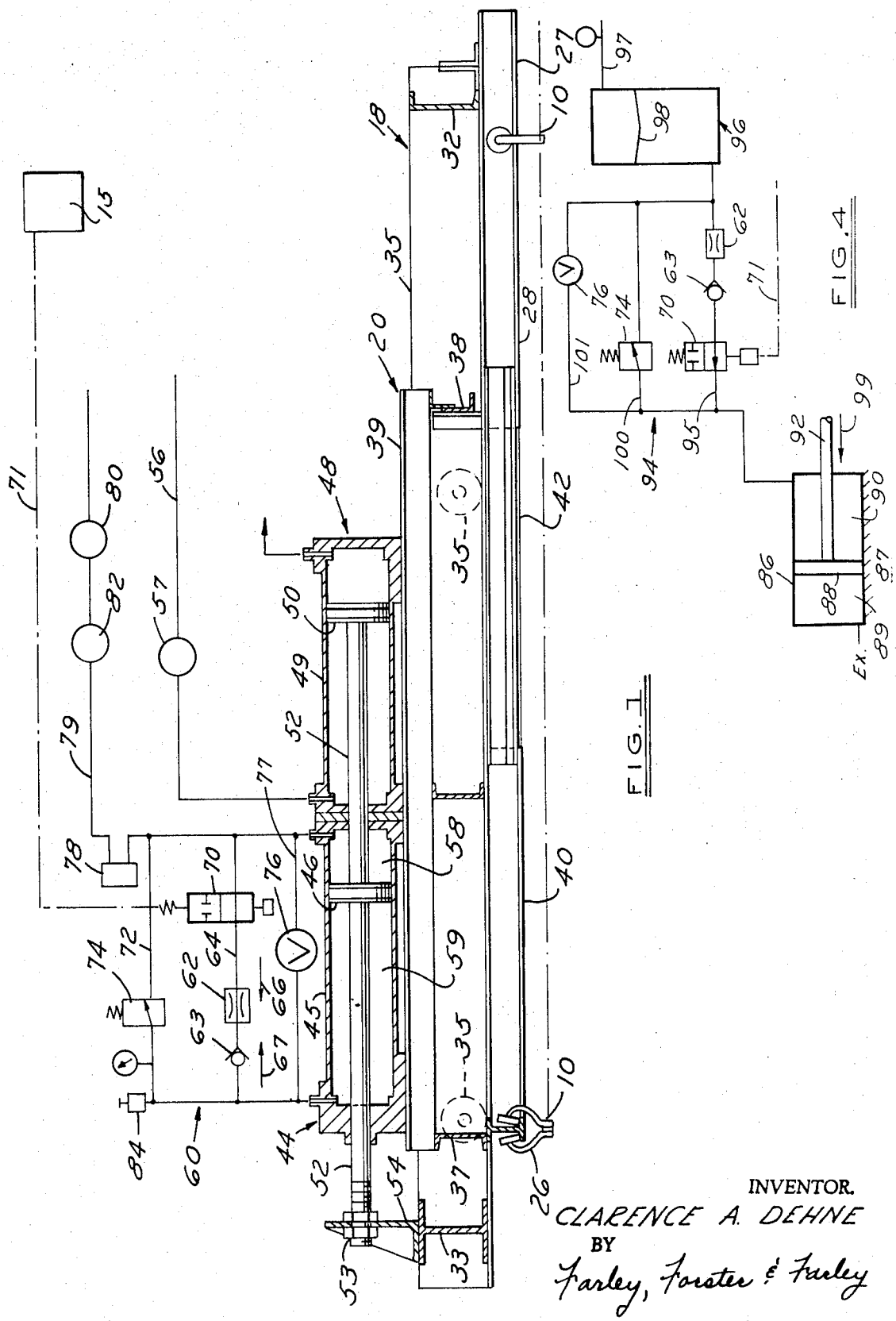

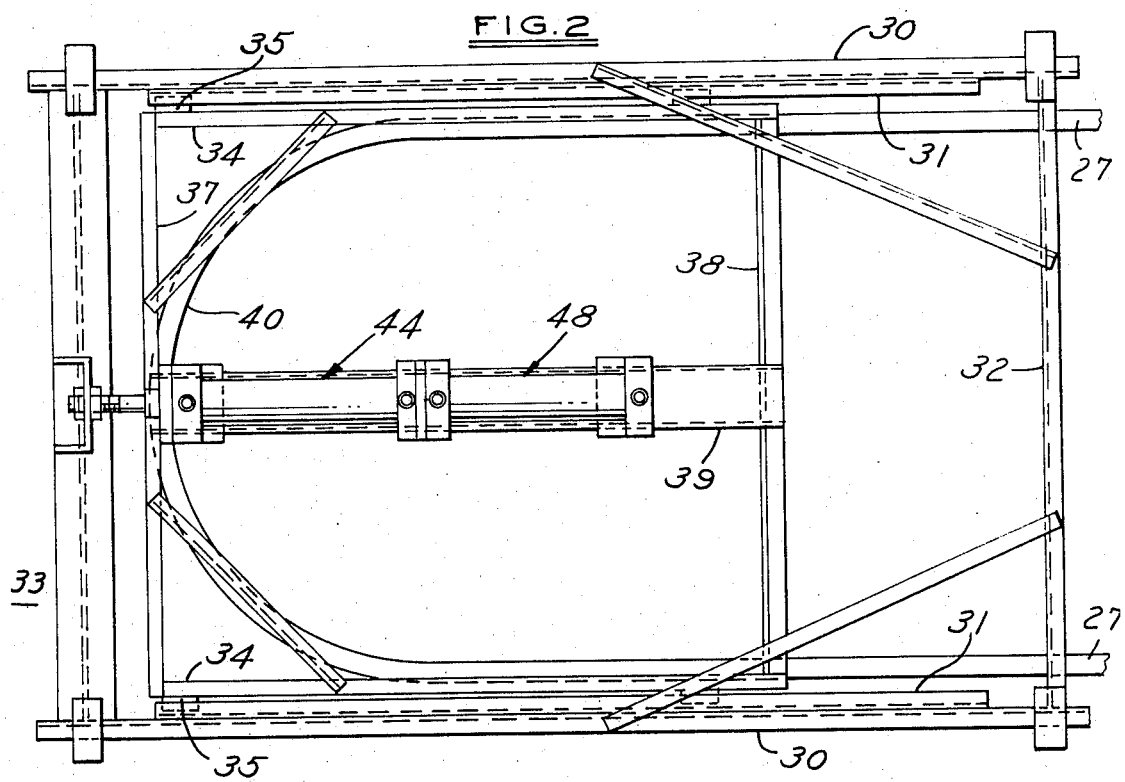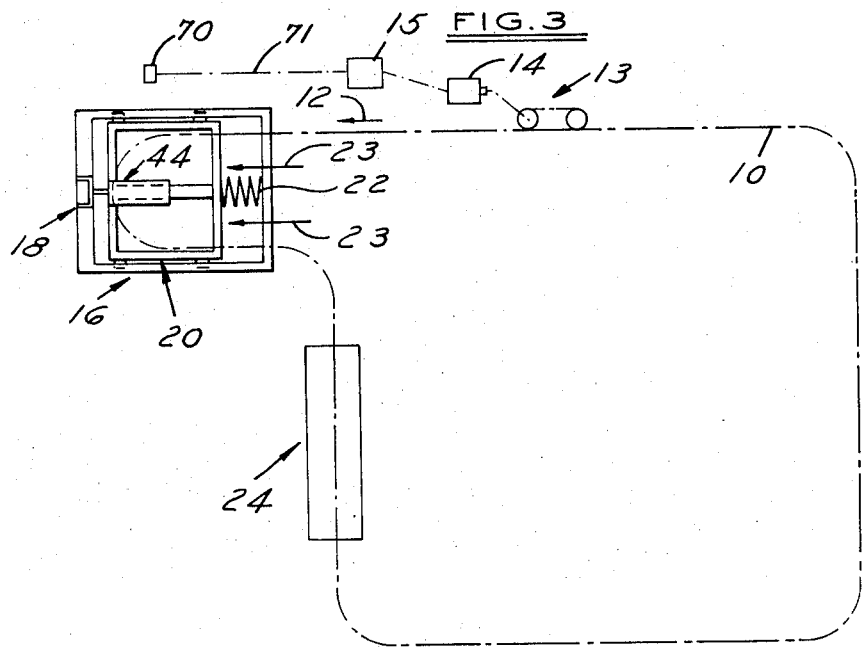

CONTROL FOR A CONVEYOR TAKE-UP

SUMMARY OF THE INVENTION

The present invention relates to a control for a take-up employed to apply tension to an endless conveyor chain.

Such a take-up is usually installed following a drive unit for the endless chain, and consists of a fixed frame, and a movable frame carried thereby. The movable frame supports or engages the conveyor chain and is normally urged by spring, counterweight or fluid pressure means in a direction such as to apply a tension force to the chain and extend the take-up, thereby compensating for any slack chain which may result from chain loading, chain wear, temperature changes, or any combination of these factors.

In many conveyor installations, forces may be created in the conveyor chain, either occasionally or periodically, which tend to collapse a take-up and cause slack chain to appear at some other place in the system. An example of a condition that can produce these collapsing forces on the take-up is found in a system where heavily loaded carriers periodically negoiate a vertical decline located relatively close to a take-up unit; or, in a system where the conveyor chain is driven by multiple drives, and one drive may occasionally create a collapsing force on a take-up in an effort to help another drive.

One prior solution to the problem of providing proper take-up operation under such conditions has merely involved applying to the movable take-up frame an extending force greater than any collapsing force to which the take-up is subjected. This creates high tension in the conveyor chain at all times, whether necessary or not; increases the conveyor chain pull requirements considerably, thereby reducing the amount of practical work that can be accomplished; and subjects components of the system to excessive wear and fatigue. A second prior approach involves the use of a one-way ratchet device which permits the take-up to extend under the normal tension force but prohibits the take-up from collapsing. However, should a jam occur in the system and cause an abnormal amount of slack chain to develop, the take-up will extend and lock in place. When normal operating conditions are restored, the chain will remain in a high tension condition because the take-up cannot return. Some conveyor systems include an oven through which the chain passes, and the ratchet device is not satisfactory in this type of system because the take-up must be free to collapse to allow for contraction of the chain when the system is shut down and the chain temperature decreases.

The present invention provides a take-up control which automatically regulates the operation of the take-up under all conditions such as mentioned above, both normal and abnormal for a particular system, the control acting to prevent undesired collapsing of a take-up under normal conditions, to permit collapsing of the take-up under abnormal conditions, and to allow a return to normal operation when the abnormality has been corrected.

A take-up control constructed in accordance with the invention comprises a hydraulic unit having a cylinder member and a piston member dividing the cylinder member into two chambers. One of the cylinder and piston members is connected to the fixed frame of a take-up and the other of said members is connected to the movable frame thereof. A hydraulic circuit connected to at least one chamber of the hydraulic unit includes flow control means for permitting fluid flow in one direction, and obstructing fluid flow in the opposite direction. The direction in which fluid flow is permitted allows relative movement between the cylinder and piston members occasioned by movement of the movable take-up frame in the extending direction.

Preferably, the flow control means includes an orifice which limits the rate of fluid flow in the one direction, thereby limiting the rate of movement of the movable take-up frame in the extending direction, and a check valve connected in series with the orifice to obstruct fluid flow in the opposite direction.

Other preferred components of the hydraulic circuit include a solenoid valve in series with the orifice and check valve, which solenoid valve is closed in response to a non-driving condition of the conveyor driving unit; a relief valve in parallel with the orifice and check valve to permit collapsing movement of the movable take-up frame in response to excessive chain forces in the collapsing direction; a manually operable valve, in parallel with the orifice and check valve and with the relief valve, which when opened provides a free fluid passage; and, a reservoir for maintaining the chambers and hydraulic circuit full of fluid.

Other features and advantages of the invention will appear from the description to follow of the representative embodiments thereof disclosed in the accompanying drawings.

DESCRIPTION OF THE DRAWINGS

FIG. 1 is a sectional elevation of a representative take-up construction equipped with the control of the invention, and including a schematic diagram of the hydraulic circuit of the control;

FIG. 2 is a plan view on a reduced scale of the take-up and control shown in FIG. 1;

FIG. 3 is a schematic diagram of a conveyor system incorporating a take-up and the control of the invention; and, FIG. 4 is a schematic diagram of an alternate form of take-up control.

DESCRIPTION OF THE PREFERRED EMBODIMENTS

Referring first to FIG. 3, the conveyor system shown therein includes an endless chain 10, represented by the broken line, driven in the direction indicated by the arrow 12 by a drive unit 13 which includes a drive motor 14 and drive motor control panel 15. A take-up 16 is installed downstream in the direction of chain travel 12 from the drive unit 13 and includes a fixed frame 18 and a movable frame 20 carried thereby, the movable frame engaging the chain 10, or supporting the chain 10 through a track on which trolleys connected to the chain travel, as in a conventional overhead conveyor. Suitable means such as a spring 22 applies a force indicated by the arrows 23 to the movable frame. This force causes the movable frame to apply tension to the conveyor chain 10 and to move in what will be referred to as an "extending" direction in the event slack chain should develop.

An element in the system of FIG. 3 which can produce a force on the take-up 16 opposite in direction to the force 23 is schematically depicted by the box 24. This element could comprise a vertical decline in the conveyor, or a second drive unit for the chain 10, or an oven. In the case of a vertical decline, a heavily loaded carrier traversing this decline would produce a force on the chain 10 tending to displace the movable take-up frame 20 in an opposite, or what will be referred to as a "collapsing", direction. If the element 24 is another drive unit operating momentarily faster than the drive unit 13, a similar force will be created tending to collapse the take-up. If the element 24 is an oven through which the chain 10 passes, a collapsing force will be produced when the oven is shut off and the chain cools.

Basic conventional structural components of the take-up 16 are illustrated in FIGS. 1 and 2 for a conveyor system in which the chain 10 is supported by trolleys 26 from an overhead rail 27. For the fixed frame 18, these components include a pair of side members 30, each having a track surface 31, and a pair of end members 32 and 33, the end member 32 being connected to terminal portions 28 of the track 27 for the trolleys 26. The movable frame 20 includes a pair of side members 34, each having a pair of wheels 35 carried by the track surfaces 31 of the fixed frame, the side members 34 being connected together by end members 37 and 38, and these end members being also connected by a central longitudinal member 39. A U-shaped track section 40 for the conveyor trolleys 26 is carried by the movable frame, with suitable expansion joints 42 extending between this U-shaped track section and the terminal portions 28 of the fixed track 27.

The control of the invention comprises a hydraulic unit 44 mounted on the central longitudinal member 39 of the movable take-up frame, and having a cylinder member 45 and a piston member 46. In the construction shown in FIGS. 1 and 2, the hydraulic unit 44 is combined with an air pressue unit 48 having a cylinder 49 connected in end-to-end relation with the cylinder 45, and a piston 50. The piston 50 of the air pressure unit 48 and piston 46 of the hydraulic unit 44 are mounted on a common rod 52 extending axially through the cylinders 45 and 49, and having a free end 53 connected to a bracket 54 attached to the fixed frame end member 33.

Air pressure is supplied through a line 56 and a regulator 57 connected therein, to the cylinder 49 of the air pressure unit 48, and, since the position of the piston 50 is fixed, this air pressure exerts a force normally urging the movable frame 20 in the extending direction. Hence, the air pressure unit 48 performs a function similar to the spring 22 in FIG. 3. It will be understood that in a case where a spring or a counterweight is employed as a means normally urging the movable frame in an extending direction, the air pressure unit 48 would not be employed, and the construction would only include a hydraulic unit 44. Further, although the hydraulic unit 44 is shown with the cylinder member 45 thereof connected to the movable frame 20 and the piston member 46 connected to the fixed frame 18, the mounting of the cylinder and piston members can obviously be transposed.

The piston member 46 of the hydraulic unit 44 divides the cylinder member 45 thereof into two chambers 58 and 59 which are connected by a hydraulic circuit 60, as shown in FIG. 1. This circuit 60 includes flow control means, in the form of an orifice 62 and check valve 63 arranged in series with the orifice in a passageway 64, for permitting fluid flow between the chambers 58 and 59 in one direction indicated by the arrow 66 and obstructing fluid flow in the opposite direction indicated by the arrow 67. Fluid flow in the direction 66 enables fluid to be displaced from the chamber 58 to the chamber 59 as a result of the relative movement between the cylinder member 45 and piston member 46 which is occasioned by movement of the movable take-up frame 20 in the extending direction, with the rate of flow being controlled by the orifice 62. Fluid flow in the opposite direction 67 is blocked by the check valve 63 which prevents relative movement between the cylinder member 45 and piston member 46 occasioned by movement of the movable take-up frame 20 in the collapsing direction.

A normally open solenoid controlled valve 70 is connected in the passage 64 in series with the orifice 62 and check valve 63. This valve 70 is connected by an electrical interlock 71 to the control panel 15 for the conveyor drive motor 14 so that the valve 70 is closed in response to a non-driving condition of the conveyor driving unit 13.

Connected in a passage 72, in parallel with the passage 64, is a pressure relief valve 74 which permits fluid flow to the chamber 58 in the event fluid pressure in the chamber 59 exceeds the setting of the valve 74.

A manual valve 76 is installed in a third parallel passage 77. This valve 76 is normally closed, but when opened, fluid is free to flow between the chambers 58 and 59 in either direction.

The hydraulic circuit 60 is provided with a reservoir 78 to maintain the chambers 58 and 59, and the components of the circuit 60 filled with hydraulic fluid. Preferably, the reservoir 78 is a combination air-oil unit supplied with air pressure through a line 79 which includes a regulator 80 and a shut-off valve 82 which closes in the event the air pressure fails. A bleeder valve 84 is provided to aid in obtaining and maintaining a full fluid condition in the hydraulic unit and circuit. Compensation for hydraulic fluid leakage is the only function performed by the reservoir 78 in the construction illustrated because the end-to-end arrangement of the units 44 and 48 results in balanced volumes of the chambers 58 and 59 of the hydraulic unit. When the hydraulic unit is used separately, as mentioned above, the volumes of the chambers 58 and 59 will not be balanced because of the absence of the rod 52 in one of the chambers, and the reservoir 78 must have sufficient capacity to compensate for the difference in volume.

In normal operation, a regulated extending force is applied to the movable take-up frame 20 by the air pressure unit 48. As slack chain is developed in the system, the movable frame 20 of the take-up gradually extends to compensate therefor. The hydraulic unit 44 has no influence upon this normal take-up action, and does not introduce any additional chain tension into the system under normal conditions. As the movable frame 20 of the take-up extends, fluid flows from the chamber 58 to the chamber 59 of the hydraulic unit through the normally open valve 70 and orifice 62.

A pressure setting for the relief valve 74 is established at a value greater than the pressure created within the chamber 59 as a result of a collapsing force on the take-up occasioned by a normal operating condition such as the passage of a carrier through a vertical decline or the normal balancing action of multiple drives. Hence, when such normal collapsing forces are imposed upon the movable frame of the take-up, no collapsing movement thereof ensues due to the action of the check valve 63. An abnormal collapsing force, however, will cause the valve 74 to open and permit corresponding movement of the take-up frame 20.

In the event a jam occurs in the system, creating tension in the conveyor chain which would create an abnormal amount of slack, the control of the invention limits movement of the movable take-up frame 20 resulting from this slack. The rate of take-up movement in the extending direction, resulting in fluid flow in the direction of the arrow 66 in the illustrated construction, is limited by the orifice 62. If the jam is severe enough to cause the conveyor drive motor to shut down, the solenoid valve 70 automatically closes, thereby blocking fluid flow through the passage 64 and preventing take-up movement in the extendng direction.

FIG. 4 illustrates an alternate, all hydraulic form of take-up control. A cylinder 86, connected to the fixed frame 87 of a take-up, has a piston 88 dividing the cylinder into two chambers 89 and 90 and a rod 92 suitably connected to the movable take-up frame. A hydraulic circuit 94, containing components similar to those previously described and identified by the same reference numerals, is connected to one of the chambers 90, and by a line 95 to an accumulator 96. Air pressure is applied through a line 97 to one side of the accumulator diaphram 98.

Flow control means in line 95 of the hydraulic circuit 94 includes an orifice 62 for permitting fluid flow from the accumulator 96 to the chamber 90 and applying a force to the piston 88 to normally urge the movable take-Up frame in the extending direction, as indicated by the arrow 99. Line 95 of the hydraulic circuit 94 also includes a check valve 63 to prevent fluid flow and hence movement of the movable take-up frame in the opposite, or collapsing direction. A normally open solenoid controlled valve 70 interlocked by a connection 71 to the conveyor driving unit, as previously described, obstructs fluid flow in response to a non-driving condition of the conveyor driving unit.

As in the previously described embodiment, the hydraulic circuit 94 includes a pressure relief valve 74 installed in a by-pass line 100 and a manually operable valve 76 installed in a second by-pass line 101.

In order for the control of the invention to function properly, high collapsing forces on the movable take-up frame 20 must not be continuous. There must be brief periods when high collapsing forces are not present in order to permit the normal extending movement of the take-up to compensate for slack chain.

I claim:

1. A control for a take-up of a conveyor having an endless chain driven by a driving unit, the take-up including a fixed frame, a moveable frame carried thereby and supporting the endless chain, and means normally urging the moveable frame in an extending direction such as to apply tension to the endless chain, wherein the improvement comprises:

means for regulating the movement of the moveable frame including, a hydraulic unit having a cylinder member and a piston member dividing the cylinder member into two chambers, one of the cylinder and piston members being connected to the fixed frame of the take-up and the other of said members being connected to and moveable with the moveable frame of the take-up, fluid flow passages communicating with each of said chambers, and flow control means connected to at least one of said passages for permitting fluid flow therethrough at a controlled rate in one direction and a normally open valve for obstructing such fluid flow in said one direction in response to a non-driving condition of the conveyor driving unit, said one direction of fluid flow allowing relative movement between the cylinder and piston members occasioned by normally urged movement of the moveable take-up frame in the extending direction.

2. A control according to claim 1 wherein the flow control means includes an orifice and a check valve in series, said normally open valve is in series with said orifice and check valve, said normally open valve being electrically interlocked with the conveyor driving unit.

3. A control according to claim 1 wherein said regulating means includes a manually operable valve connected in parallel with the flow control means, said manually operable valve permitting fluid flow in both directions when open.

4. A control according to claim 1 wherein said regulating means includes a pressure relief valve connected in parallel with the flow control means, said pressure relief valve being capable of permitting flow in response to a hydraulic pressure build-up in excess of a preset valve resulting from force on the moveable take-up frame in the direction of collapsing movement thereof.

5. A control according to claim 1 wherein the means normally urging the movable frame in an extending direction includes a hydraulic fluid reser-voir, means for applying pressure to hydraulic fluid contained therein, said pressure forcing hydraulic fluid through the flow control means in said one direction.

6. A control according to claim 1 wherein the means normally urging the movable frame in an extending direction includes a second fluid pressure cylinder member connected to the cylinder member of said hydraulic unit in end-to-end relation, a rod extending through the cylinder member of the hy-draulic unit and into the second fluid pressure cylinder member, a second piston secured to the rod within the second fluid pressure cylinder member, and means for applying fluid pressure to one side of the second piston for nor-mally urging the movable frame of the take-up in the extending direction.

* * * * *